(12) United States Patent
Harbuzaru et al.

(10) Patent No.: US 7,074,385 B2
(45) Date of Patent: Jul. 11, 2006

(54) IM-12 CRYSTALLIZED SOLID AND ITS PROCESS OF PREPARATION

(75) Inventors: Bogdan Harbuzaru, Lyons (FR); Jean-Louis Paillaud, Mulhouse (FR); Joël Patarin, Flaxlanden (FR); Nicolas Bats, Pomeys (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/871,700

(22) Filed: Jun. 21, 2004

(65) Prior Publication Data

US 2005/0067604 A1    Mar. 31, 2005

(30) Foreign Application Priority Data

Sep. 26, 2003    (FR) .................................. 03 11333

(51) Int. Cl.
  *C01B 39/48*    (2006.01)
(52) U.S. Cl. ........................ 423/718; 423/706
(58) Field of Classification Search ............ 423/718, 423/706
See application file for complete search history.

(56) References Cited

U.S. PATENT DOCUMENTS 6,086,848 A * 7/2000 Nakagawa et al. ......... 423/706
6,464,956 B1 * 10/2002 Elomari ...................... 423/706
2003/0180217 A1 * 9/2003 Canos et al. ................ 423/718

FOREIGN PATENT DOCUMENTS

WO    WO 02/30820 A1 *  4/2002

OTHER PUBLICATIONS

Paillaud et al., "Extra-Large-Pore Zeolites With Two Dimensional Channels Formed by 14 and 12 Rings," Science, vol. 304, pp. 990-992, May 14, 2004.*
Atlas of Zeolite Structure Types, http://topaz.ethz.ch/IZA-SC/StdAtlas.htm☐☐Section related to framework type UTL, isotypic frameworks.*

* cited by examiner

*Primary Examiner*—David Sample
(74) *Attorney, Agent, or Firm*—Millen, White, Zelano & Branigan, P.C.

(57) ABSTRACT

The invention relates to a crystallized solid, referred to by the name IM-12, which exhibits an x-ray diffraction diagram as provided below. Said solid exhibits a chemical composition that is expressed on an anhydrous base, in terms of oxide moles, by the formula $XO_2$:m $YO_2$:p $Z_2O_3$:q $R_{2/n}O$, where R represents one or more cation(s) of valence n, X represents one or more different tetravalent element(s) of germanium, Y represents germanium, and Z represents at least one trivalent element.

6 Claims, 3 Drawing Sheets

IM-12 CRYSTALLIZED SOLID AND ITS PROCESS OF PREPARATION

TECHNICAL FIELD

Figure 1:
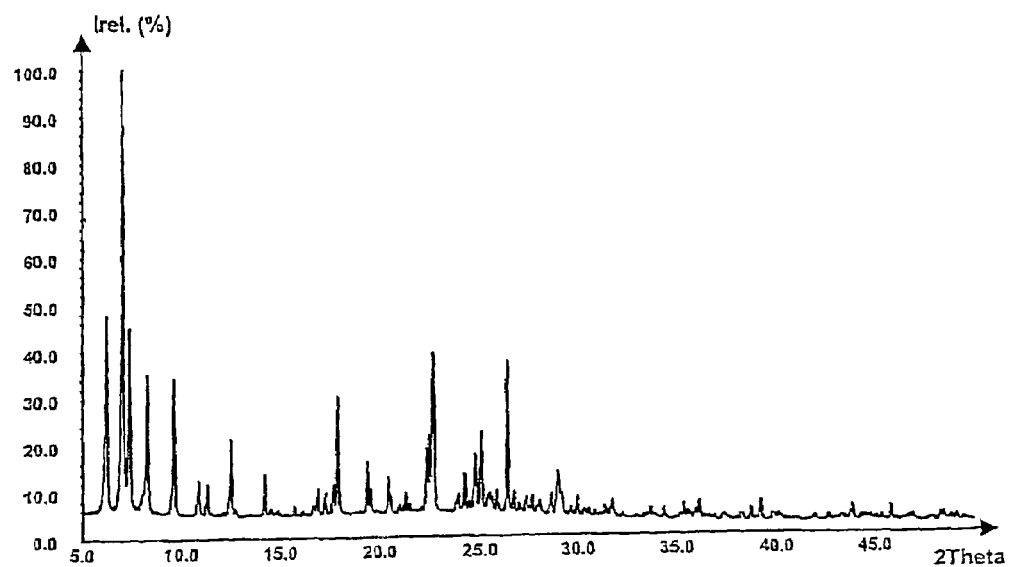

This invention relates to a new crystallized solid that is called IM-12 below and that exhibits a new crystalline structure as well as a process for preparation of said solid.

PRIOR ART

During recent years, the search for new microporous molecular sieves led to the synthesis of a large variety of this class of products. A large variety of aluminosilicates with a zeolitic structure that are characterized in particular by their chemical composition, the diameter of the pores that they contain, and the shape and the geometry of their microporous system were thus developed.

Among the zeolites synthesized for about forty years, a certain number of solids have made it possible to achieve significant progress in the fields of adsorption and catalysis. Among the latter, it is possible to cite the Y zeolite (U.S. Pat. No. 3,130,007) and the ZSM-5 zeolite (U.S. Pat. No. 3,702,886). The number of new molecular sieves that cover the zeolites, synthesized each year, is in constant progression. To have a more complete description of the different molecular sieves that have been discovered, it is possible to refer in a useful manner to the following work: "Atlas of Zeolites Structure Types," Ch. Baerlocher, W. M. Meier and D. H. Olson, Fifth Revised Edition, 2001, Elsevier. It is possible to cite the NU-87 zeolite (U.S. Pat. No. 5,178,748), the MCM-22 zeolite (U.S. Pat. No. 4,954,325) or else the gallophosphate (cloverite) of CLO structural type (U.S. Pat. No. 5,420,279) or else the zeolites ITQ-12 (U.S. Pat. No. 6,471,939), ITQ-13 (U.S. Pat. No. 6,471,941), CIT-5 (U.S. Pat. No. 6,043,179), ITQ-21 (WO-02/092511), ITQ-22 (Corma, A. et al., Nature Materials 2003, 2, 493), SSZ-53 (Burton, A., et al., Chemistry: A Eur. Journal, submitted), SSZ-59 (Burton, A., et al., Chemistry: A Eur. Journal, submitted), SSZ-58 (Burton, A., et al., J. Am. Chem. Soc., 2003, 125, 1633) and UZM-5 (Blackwell, C. S. et al., Angew. Chem. [Applied Chemistry], Int. Ed., 2003, 42, 1737).

Several zeolites that were cited above have been synthesized in a fluoride medium in which the mobilizing agent is not the usual hydroxide ion but the fluoride ion according to a process that was initially described by J.-L. Guth et al. (Proc. Int. Zeol. Conf., Tokyo, 1986, p. 121). The pH values of the synthesis media are typically close to neutrality. One of the advantages of these fluorinated reaction systems is to allow purely silicic zeolites that contain fewer defects than the zeolites that are obtained in the traditional OH⁻ medium to be obtained (J. M. Chézeau et al., Zeolites, 1991, 11, 598). Another decisive advantage that is linked to the use of fluorinated reaction media is to make it possible to obtain new framework topologies that contain double cycles with four tetrahedrons as is the case of the ITQ-7, ITQ-13 and ITQ-17 zeolites. The joint use of germanium and silicon sources in the synthesis media, however, may make it possible to obtain such frameworks made of a non-fluorinated standard basic medium, as in the case of the ITQ-17 and ITQ-21 zeolites (A. Corm et al., Chem. Commun., 2001, 16, 1486, Chem. Commun., 2003, 9, 1050).

DESCRIPTION OF THE INVENTION

This invention relates to a new crystallized solid, called an IM-12 crystallized solid, that exhibits a new crystalline structure. Said solid exhibits a chemical composition that is expressed on an anhydrous base, in terms of oxide moles, defined by the following general formula: $XO_2$:m $YO_2$:p $Z_2O_3$:q $R_{2/n}O(I)$ in which R represents one or more cation(s) of valence n, X represents one or more tetravalent element(s) different from germanium, Y represents germanium, Z represents at least one trivalent element, while m, p, and q respectively represent the mole number of $YO_2$, $Z_2O_3$ and $R_{2/n}O$, and m is between 0 and 1, p is between 0 and 0.5, and q is between 0 and 0.7.

The IM-12 crystallized solid according to the invention exhibits, in its crude synthesis form, an x-ray diffraction diagram that includes at least the lines that are inscribed in Table 1. The IM-12 crystallized solid according to the invention exhibits, in its calcined form, an x-ray diffraction diagram that includes at least the lines that are inscribed in Table 2. This new IM-12 crystallized solid exhibits a new crystalline structure.

These diffraction diagrams are obtained by radiocrystallographic analysis by means of a diffractometer by using the standard powder method with $K\alpha_1$ radiation of copper ($\lambda$=1.5406 Å). Starting from the position of the peaks of diffraction represented by angle 2θ, the characteristic $d_{hkl}$ recticular equidistances of the sample are calculated by Braag's equation. The estimation of the measuring error $\Delta(d_{hkl})$ to $d_{hkl}$ is calculated, based on the absolute error $\Delta(2\theta)$ that is assigned to the measurement of 2θ, by Bragg's equation. An absolute error $\Delta(2\theta)$ that is equal to ±0.2° is commonly allowed. The relative intensity $I_{rel}$ that is assigned to each value of $d_{hkl}$ is measured according to the height of the corresponding diffraction peak. The x-ray diffraction diagram of the IM-12 crystallized solid according to the invention, in its crude synthesis form, comprises at least the lines to the values of $d_{hkl}$ provided in Table 1. The x-ray diffraction diagram of the IM-12 crystallized solid according to the invention, in its calcined form, comprises at least the lines to values of $d_{hkl}$ provided in Table 2. In the $d_{hkl}$ column, the mean values of the inter-reticular distances are indicated in Angstroms (Å). Each of these values should be provided with the measuring error $\Delta(d_{hkl})$ between ±0.2 Å and ±0.008 Å.

TABLE 1

Mean values of $d_{hkl}$ and relative intensities measured on an x-ray diffraction diagram of the crude synthesis IM-12 crystallized solid

| $D_{hkl}$ (Å) | 2 theta (°) | $I/I_o$ |
| --- | --- | --- |
| 14.20 | 6.22 | mf |
| 12.51 | 7.06 | FF |
| 11.93 | 7.41 | mf |
| 10.65 | 8.30 | mf |
| 9.19 | 9.62 | mf |
| 8.16 | 10.83 | ff |
| 7.83 | 11.28 | ff |
| 7.10 | 12.45 | mf |
| 6.97 | 12.68 | ff |
| 6.26 | 14.14 | ff |

TABLE 2

Mean values of $d_{hkl}$ and relative intensities measured on an x-ray diffraction diagram of the calcined IM-12 crystallized solid

| $d_{hkl}$ (Å) | 2 theta (°) | $I/I_o$ |
|---|---|---|
| 14.40 | 6.13 | FF |
| 12.60 | 7.00 | F |
| 11.98 | 7.37 | f |
| 10.69 | 8.27 | f |
| 9.22 | 9.58 | f |
| 8.22 | 10.76 | ff |
| 7.91 | 11.17 | ff |
| 7.37 | 12.00 | ff |
| 7.19 | 12.29 | ff |
| 7.00 | 12.64 | ff |
| 6.30 | 14.05 | ff |
| 6.12 | 14.46 | ff |
| 5.98 | 14.80 | ff |
| 5.66 | 15.64 | ff |
| 5.32 | 16.65 | ff |
| 5.18 | 17.10 | ff |
| 5.07 | 17.48 | ff |
| 5.02 | 17.65 | ff |
| 4.60 | 19.28 | ff |
| 4.56 | 19.45 | ff |
| 4.36 | 20.35 | ff |
| 4.24 | 20.93 | ff |
| 4.19 | 21.19 | ff |
| 4.14 | 21.45 | ff |
| 4.06 | 21.87 | ff |
| 3.98 | 22.29 | ff |
| 3.95 | 22.47 | ff |
| 3.93 | 22.60 | ff |
| 3.91 | 22.68 | ff |
| 3.75 | 23.69 | ff |
| 3.72 | 23.88 | ff |
| 3.68 | 24.14 | ff |
| 3.62 | 24.56 | ff |
| 3.59 | 24.73 | ff |
| 3.53 | 25.16 | ff |
| 3.49 | 25.47 | ff |
| 3.39 | 26.20 | ff |
| 3.35 | 26.55 | ff |
| 3.28 | 27.11 | ff |
| 3.23 | 27.52 | ff | where FF = very high;
m = mean;
f = low;
F = high;
mf = medium low;
ff = very low.

Relative intensity $I/I_o$ is provided relative to a relative intensity scale where a value of 100 is attributed to the most intense line of the x-ray diffraction diagram: ff<15; 15≦f<30; 30≦mf<50; 50≦m<60; 60≦F<85; FF≧85.

The most intense line (I/IO=100) in the x-ray diffraction diagram of the calcined IM-12 crystallized solid is the one for which 2 theta=6.13° and $d_{hkl}$=14.40 Å. The line for which 2 theta=7.00° exhibits an I/IO relative intensity of between 60 and 85. The relative intensity of the line at 2 theta=7.00° preferably represents between 62 and 68% of that of the most intense line.

Figure 2:
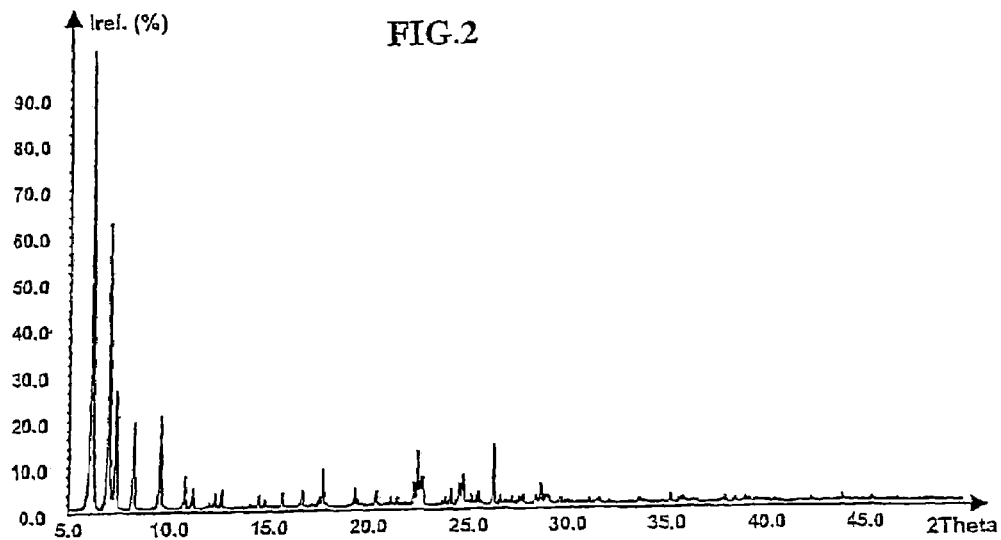
Figure 3:
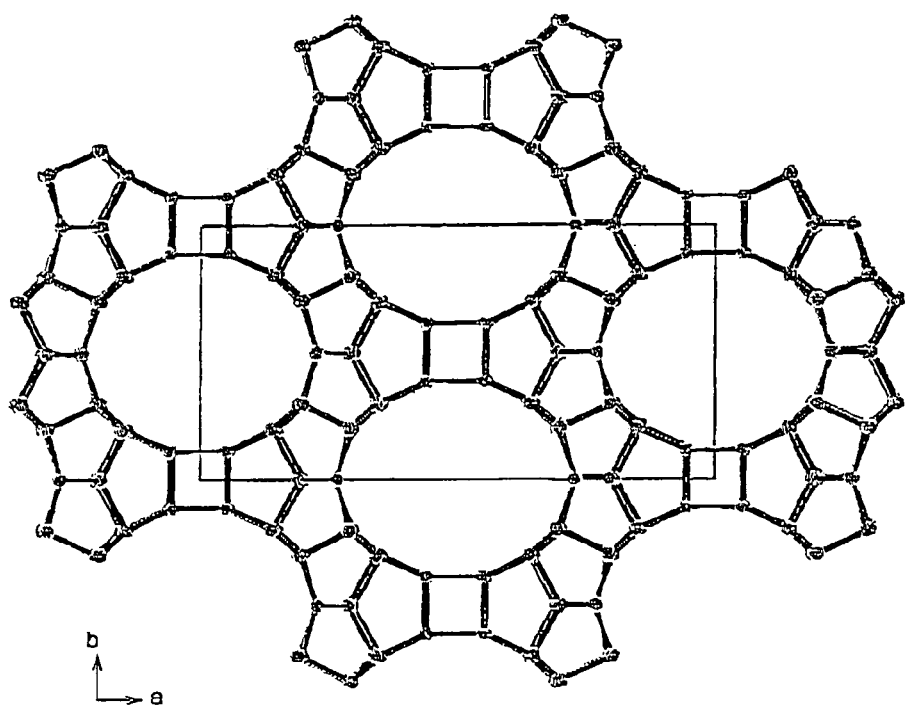
Figure 4:
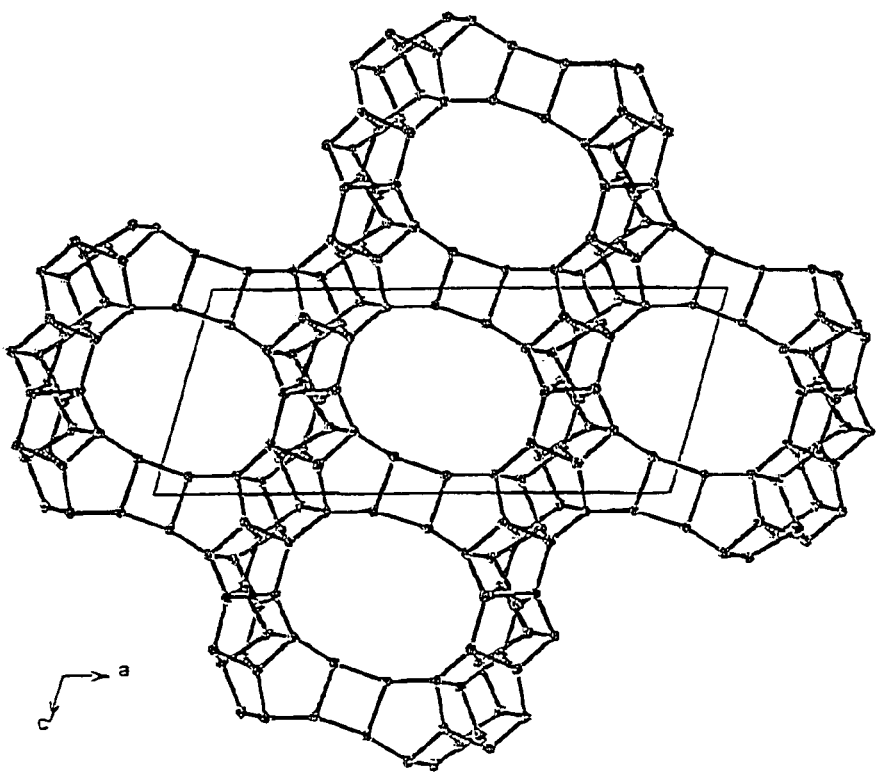
Figure 5:
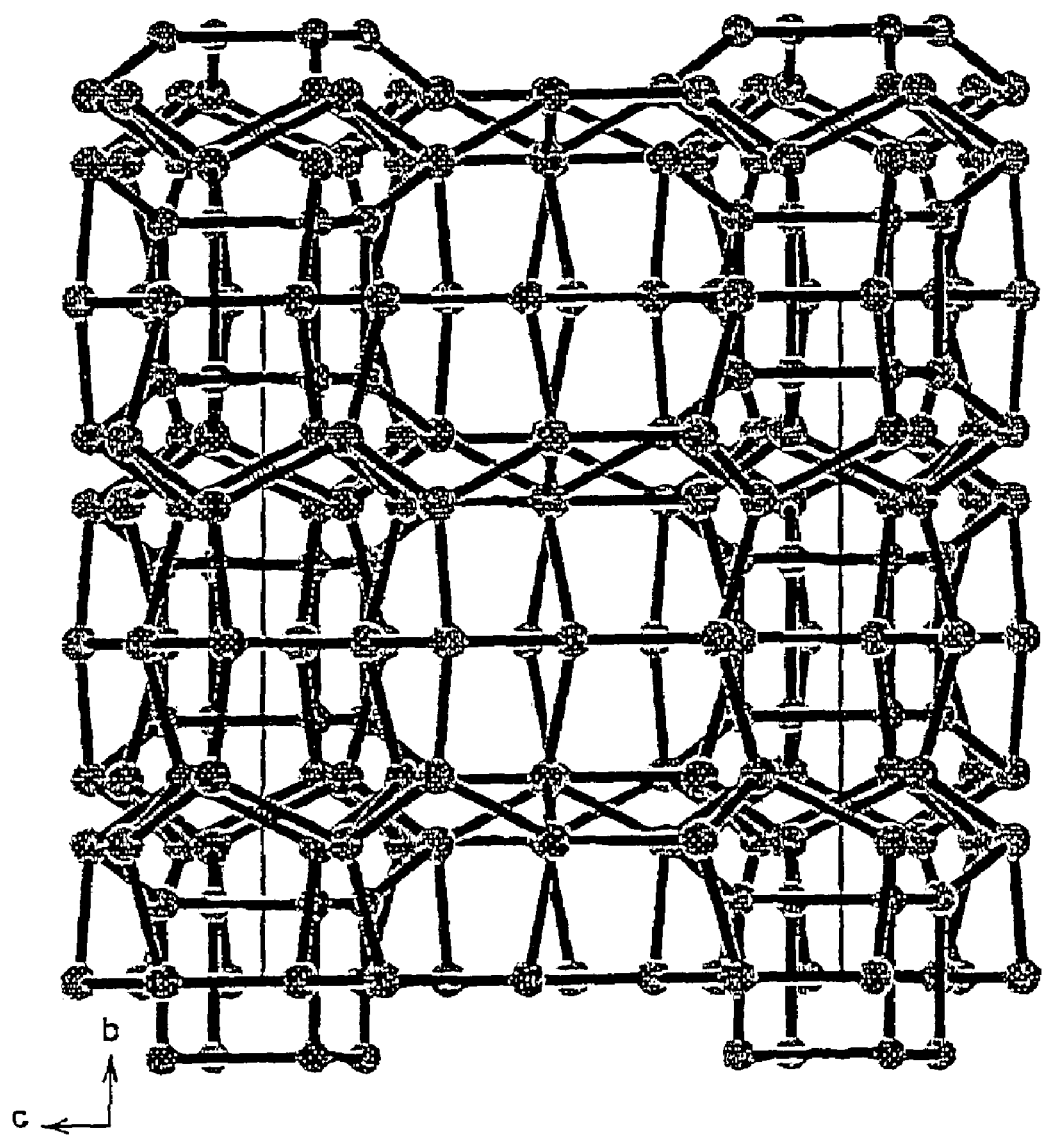

The IM-12 crystallized solid according to the invention exhibits a new crystalline structure with a base or topology that is characterized by its X diffraction diagrams in crude synthesis forms and a calcined structure provided by FIGS. 1 and 2 respectively. The new crystalline structure of the IM-12 crystallized solid according to the invention is a three-dimensional structure that is formed by tetrahedrons. FIG. 3 represents a projection of the structure of the IM-12 solid according to [001]. FIG. 4 represents a projection of the structure of the IM-12 solid according to [010]. FIG. 5 represents a projection of the structure of the IM-12 solid according to [100]. It comprises in particular double-cycle-type units with four tetrahedrons. The peak of each tetrahedron is occupied by one oxygen atom. The IM-12 crystallized solid according to the invention has a new topology with a system of interconnected two-dimensional channels comprising two types of straight channels defined by openings with 14 and 12 X and/or Y and/or Z atoms respectively, whereby said atoms are in a coordination number 4, i.e., surrounded by four oxygen atoms (FIGS. 3 and 4). The projection onto the crystallographic axis with the IM-12 structure (FIG. 5) well illustrates the closed appearance along this direction.

Said IM-12 solid exhibits a chemical composition, expressed on an anhydrous base, in terms of oxide moles, defined by the following general formula: $XO_2$:m $YO_2$:p $Z_2O_3$:q $R_{2/n}O$:(I) in which R represents one or more cation(s) of valence n, X represents one or more different tetravalent element(s) of germanium, Y represents germanium, and Z represents at least one trivalent element. In formula (I), m, p, and q respectively represent the mole number of $YO_2$, $Z_2O_3$, $R_{2/n}O$ and m is between 0 and 1, p is between 0 and 0.5, and q is between 0 and 0.7.

Advantageously, the Ge/X ratio of the framework of the IM-12 crystallized solid according to the invention is between 0.02 and 1 and preferably between 0.05 and 0.33. Preferably, m is between 0.05 and 1 and even more preferably, m is between 0.05 and 0.5. The ratio $\{(1+m)/p\}$ is greater than or equal to 5 and is preferably greater than or equal to 7. The value of p is preferably between 0 and 0.5, very preferably between 0 and 0.4, and even more preferably between 0.01 and 0.4. The q values are advantageously between 0.01 and 0.7, and very advantageously between 0.1 and 0.5.

According to the invention, X is preferably selected from among silicon, tin and titanium, and Z is preferably selected from among aluminum, boron, iron, indium and gallium, and very preferably Z is aluminum. In a preferred manner, X is silicon: the IM-12 crystallized solid according to the invention is then a crystallized metallosilicate that has an x-ray diffraction diagram that is identical to the one that is described in Table 1 when it is found in its crude synthesis form and identical to the one that is described in Table 2 when it is found in its calcined form. Even more preferably, X is silicon, and Z is aluminum: the IM-12 crystallized solid according to the invention is then a crystallized aluminosilicate that exhibits an x-ray diffraction diagram that is identical to the one that is described in Table 1 when it is found in its crude synthesis form and identical to the one that is described in Table 2 when it is found in its calcined form.

In the case where the IM-12 crystallized solid according to the invention is in its crude synthesis form, i.e., obtained directly from the synthesis and prior to any stage of calcinations(s) and/or ion exchange(s) that are well known to one skilled in the art, said IM-12 solid comprises at least one nitrogen-containing organic cation such as the one that is described below or its decomposition products, or else its precursors. In its crude synthesis form, the R cation(s) that is (are) present in formula (I) is (are) at least in part, and preferably entirely, said nitrogen-containing organic cation(s). According to a preferred embodiment of the invention, R is the cation (6R,10S)-6,10-dimethyl-5-azoniaspiro[4,5]decane. The structure can be eliminated by the standard methods of the prior art such as heat treatments and/or chemical treatments. The IM-12 crystallized solid according to the invention is preferably a zeolitic solid.

The invention also relates to a process for preparation of the IM-12 crystallized solid in which an aqueous mixture that comprises at least one source of at least one $XO_2$ oxide, optionally at least one source of the $YO_2$ oxide, optionally at least one source of at least one $Z_2O_3$ oxide and at least one nitrogen-containing organic cation R, or at least one precursor of the nitrogen-containing organic cation or at least one decomposition product of the nitrogen-containing organic cation, is reacted, whereby the mixture preferably exhibits the following molar composition:

$(XO_2+YO_2)Z_2O_3$: at least 5, preferably at least 7,
$H_2O/(XO_2+YO_2)$: 1 to 50, preferably 2 to 30,
$R/(XO_2+YO_2)$: 0.1 to 3, preferably 0.1 to 1,
$YO_2/XO_2$: 0 to 1, preferably 0.5 to 1, where X is one or more different tetravalent element(s) of germanium, preferably silicon, Y is germanium, Z is one or more trivalent element(s) selected from the group that is formed by the following elements: aluminum, iron, boron, indium and gallium, preferably aluminum.

According to the process according to the invention, R is a nitrogen-containing organic structure. Preferably, R is the nitrogen-containing organic cationic compound (6R,10S)-6,10-dimethyl-5-azoniaspiro[4,5]decane. It is preferably (6R,10S)-6,10-dimethyl-5-azoniaspiro[4,5]decane salt, preferably in hydroxide form.

The source of the X element can be any compound that comprises the X element and can release this salt in aqueous solution in reactive form. Advantageously, when the X element is silicon, the silica source can be any of those currently used in the synthesis of zeolites, for example solid silica in powder form, silicic acid, colloidal silica or dissolved silica or tetraethoxysilane (TEOS). Among the powdered silicas, it is possible to use precipitated silicas, in particular those that are obtained by precipitation starting from an alkaline metal silicate solution, such as aerosol silicas, pyrogenated silicas, for example "CAB-O-SIL," and silica gels. It is possible to use colloidal silicas that have different particle sizes, for example with a mean equivalent diameter of between 10 and 15 nm or between 40 and 50 nm such as the ones that are marketed under filed trademarks such as "LUDOX." In a preferred manner, the silicon source is LUDOX.

The source of the Z element can be any compound that comprises the Z element and that can release this element in aqueous solution in reactive form. In the preferred case where Z is aluminum, the alumina source is preferably sodium aluminate, or an aluminum salt, for example, chloride, nitrate, hydroxide or sulfate, an alkoxide of aluminum or of alumina itself, preferably in hydrated or hydratable form, such as, for example, colloidal alumina, pseudoboehmite, gamma-alumina or alpha- or beta-trihydrate. It is also possible to use mixtures of the sources that are cited above. The source of the Y element can be, for example, a germanium oxide $GeO_2$.

According to a preferred embodiment of the process according to the invention, an aqueous mixture that comprises silica, alumina, a germanium oxide and the (6R,10S)-6,10-dimethyl-5-azoniaspiro[4,5]decane hydroxide is reacted.

The process according to the invention consists in preparing an aqueous reaction mixture that is called a gel and that contains at least one source of at least one $XO_2$ oxide, optionally at least one source of the $YO_2$ oxide, optionally at least one source of at least one $Z_2O_3$ oxide, and at least one nitrogen-containing organic R cation, or at least one precursor of the nitrogen-containing organic cation or at least one decomposition product of the nitrogen-containing organic cation. The amounts of said reagents are adjusted so as to impart to this gel a composition that allows its crystallization into IM-12 crystallized solid of formula $XO_2$:m $YO_2$:p $Z_2O_3$; q $R_{2/n}O$, where m, p, q and n meet the criteria that are defined above. Then, the gel is subjected to a hydrothermal treatment until the IM-12 crystallized solid is formed. The gel is advantageously put under hydrothermal conditions under an autogenous reaction pressure, optionally by adding gas, for example nitrogen., at a temperature of between 120° C. and 200° C., preferably between 140° C. and 180° C., and even more preferably at a temperature that does not exceed 175° C. until the formation of IM-12 solid crystals according to the invention. The period that is necessary for obtaining the crystallization generally varies between 1 hour and several months based on the composition of the reagents in the gel, the stirring and the reaction temperature. The reaction is generally carried out while being stirred or without stirring, preferably while being stirred.

It may be advantageous to add seeds to the reaction mixture so as to reduce the time that is necessary to the formation of cores and/or the total crystallization period. It may also be advantageous to use seeds so as to promote the formation of the IM-12 crystallized solid to the detriment of impurities. Such seeds comprise crystallized solids, in particular IM-12 solid crystals. The crystalline seeds are generally added in a proportion of between 0.01 and 10% by weight of the $XO_2$ oxide, preferably silica, used in the reaction mixture.

At the end of the reaction, the solid phase is filtered and washed; it is then ready for subsequent stages such as drying, dehydration and calcination and/or ion exchange. For these stages, all of the conventional methods that are known to one skilled in the art can be used.

The calcination stage is advantageously carried out by one or more stages of heating at temperatures from 100 to 1000° C. for periods from several hours to several days. In a preferred manner, the calcination is carried out in two consecutive heating stages, the first being carried out at a temperature of between 100 and 300° C. and the second being carried out at a temperature of between 400° C. and 700° C., whereby the temperature is maintained at each stage for five to ten hours.

The invention is illustrated by means of the following examples.

EXAMPLE 1

5.78 g of aqueous solution with 20% (6R,10S)-6,10-dimethyl-5-azoniaspiro[4,5]decane hydroxide (ROH) and 0.872 g of amorphous germanium oxide (Aldrich) are poured into a beaker. After the oxide is dissolved while being stirred, 2.5 g of colloidal silica (Ludox HS-40 (Aldrich)) and 6.626 g of water are added. After homogenization, the gel is then transferred into a Teflon jacket, and then the jacket is placed in a 20-milliliter autoclave.

The molar composition of the corresponding gel is: 0.8 $SiO_2$:0.4 $GeO_2$:0.3 ROH:30 $H_2O$. The autoclave is heated for 6 hours to 170° C. in a drying oven. During synthesis, the autoclave is continually stirred, whereby the longitudinal axis of the autoclave rotates at a speed of about 15 rpm in a plane that is perpendicular to the axis of rotation. The synthesis pH is close to 12. After filtration, the product is washed with distilled water and dried at 70° C. The dried solid product was analyzed by X diffraction of powders and identified as consisting of IM-12 solid. The diffractogram that is made on the crude synthesis sample is provided by FIG. 1. The chemical analysis of the product by X fluorescence was carried out and provides the $SiO_2/GeO_2$ ratio 4.35.

About 5 g of IM-12 crystallized solid, prepared as described above, is placed in a ceramic cupel. With a muffle furnace, this sample is brought from ambient temperature to a temperature of 200° C. at a rate of 5° C. per minute. The temperature is maintained for eight hours. The temperature is then increased to 550° C. at the rate of 5° C. per minute. This temperature is maintained for eight hours. During the entire heating period, a constant air flow is maintained in the chamber of the furnace. After this heating period, the heating is interrupted, and a return to the ambient temperature is awaited. The IM-12 solid is then obtained in its calcined form of formula $SiO_2:0.23\ GeO_2$. The diffractogram that is made on the calcined IM-12 solid is provided by FIG. 2.

EXAMPLE 2

5.78 g of aqueous solution with 20% (6R,10S)-6,10-dimethyl-5-azoniaspiro[4,5]decane hydroxide (ROH), 0.872 g of amorphous germanium oxide (Aldrich) and 0.021 g of aluminum oxide (Aldrich) are poured into a beaker. After the oxide is dissolved while being stirred, 2.5 g of colloidal silica (Ludox HS-40 (Aldrich)) and 6.626 g of water are added. After homogenization, the gel is then transferred into a Teflon jacket, then the jacket is placed in a 20-milliliter autoclave. The molar composition of the corresponding gel is: $0.8\ SiO_2:0.4\ GeO_2:0.01\ Al_2O_3:0.3\ ROH:30\ H_2O$. The autoclave is heated for 6 days at 170° C. in a drying oven. During the synthesis, the autoclave is continually stirred, whereby the longitudinal axis of the autoclave rotates at a speed of about 15 rpm in a plane that is perpendicular to the axis of rotation. The synthesis pH is close to 12. After filtration, the product is washed with distilled water and dried at 70° C. The dried solid product was analyzed by X diffraction of powders and identified-as being constituted of IM-12 solid. The diffractogram that is made on the crude synthesis sample is provided by FIG. 1. The chemical analysis of the product by X fluorescence was carried out and provides the $SiO_2/GEO_2$ ratio=4.25 and the $SiO_2/Al_2O_3$ ratio=98.

About 5 g of IM-12 crystallized solid, prepared as described above, is placed in a ceramic cupel. With a muffle furnace, this sample is brought from ambient temperature to a temperature of 200° C. at a rate of 5° C. per minute. The temperature is maintained for eight hours. The temperature is then increased to 550° C. at the rate of 5° C. per minute. This temperature is maintained for eight hours. During the entire heating period, a constant air flow is maintained in the chamber of the furnace. After this heating period, the heating is interrupted, and a return to the ambient temperature is awaited. The IM-12 solid is then obtained in its calcined form. The diffractogram that is made on the calcined IM-12 solid is provided by FIG. 2.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 03/11.333, filed Sep. 26, 2003.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the preparation of an IM-12 crystallized solid that exhibits an x-ray diffraction diagram that includes at least the lines that are inscribed in the table below:

| $d_{hkl}$ (Å) | 2 theta (°) | $I/I_O$ |
|---|---|---|
| 14.40 | 6.13 | FF |
| 12.60 | 7.00 | F |
| 11.98 | 7.37 | f |
| 10.69 | 8.27 | f |
| 9.22 | 9.58 | f |
| 8.22 | 10.76 | ff |
| 7.91 | 11.17 | ff |
| 7.37 | 12.00 | ff |
| 7.19 | 12.29 | ff |
| 7.00 | 12.64 | ff |
| 6.30 | 14.05 | ff |
| 6.12 | 14.46 | ff |
| 5.98 | 14.80 | ff |
| 5.66 | 15.64 | ff |
| 5.32 | 16.65 | ff |
| 5.18 | 17.10 | ff |
| 5.07 | 17.48 | ff |
| 5.02 | 17.65 | ff |
| 4.60 | 19.28 | ff |
| 4.56 | 19.45 | ff |
| 4.36 | 20.35 | ff |
| 4.24 | 20.93 | ff |
| 4.19 | 21.19 | ff |
| 4.14 | 21.45 | ff |
| 4.06 | 21.87 | ff |
| 3.98 | 22.29 | ff |
| 3.95 | 22.47 | ff |
| 3.93 | 22.60 | ff |
| 3.91 | 22.68 | ff |
| 3.75 | 23.69 | ff |
| 3.72 | 23.88 | ff |
| 3.68 | 24.14 | ff |
| 3.62 | 24.56 | ff |
| 3.59 | 24.73 | ff |
| 3.53 | 25.16 | ff |
| 3.49 | 25.47 | ff |
| 3.39 | 26.20 | ff |
| 3.35 | 26.55 | ff |
| 3.28 | 27.11 | ff |
| 3.23 | 27.52 | ff | where FF=very high; m=mean; f=low; F=high; mf=medium low; ff=very low and that exhibits a chemical composition that is expressed on an anhydrous base, in terms of oxide moles, defined by the following general formula: $XO_2$:m $YO_2$:p $Z_2O_3$:q $R_{2/n}O$ in which R represents one or more cation(s) of valence n, X represents one or more tetravalent element(s) different from germanium, Y represents germanium, Z represents at least one trivalent element, whereby m, p and q respectively represent the mole number of $YO_2$, $Z_2O_3$ and $R_{2/n}O$, and m is between 0 and 1, p is between 0 and 0.5, and q is between 0 and 0.7, said process comprising initiating the mixing of at least one source of at least one $XO_2$ oxide, optionally at least one source of the $YO_2$ oxide, optionally at least one source of at least one $Z_2O_3$ oxide, at least one nitrogen-containing organic cation R, or at least one precursor of the nitrogen-containing organic cation or at least one decomposition product of the nitrogen-containing organic cation and then in initiating the hydrothermal treatment of said mixture until said IM-12 crystallized solid is formed, with the proviso that R is the cation (6R,10S)-6,10-dimethyl-5-azoniaspiro[4,5]decane.

2. A process for the preparation of an IM-12 crystallized solid according to claim 1, such that the molar composition of the reaction mixture is such that:

$(XO_2+YO_2)/Z_2O_3$: at least 5,
$H_2O/(XO_2+YO_2)$: 1 to 50,
$R/(XO_2+YO_2)$: 0.1 to 3,
$YO_2/XO_2$: 0 to 1.

3. A process for the preparation of an IM-12 crystallized solid that exhibits an x-ray diffraction diagram that includes at least the lines that are inscribed in the table below:

| $d_{hkl}$ (Å) | 2 theta (°) | I/I$_O$ |
|---|---|---|
| 14.40 | 6.13 | FF |
| 12.60 | 7.00 | F |
| 11.98 | 7.37 | f |
| 10.69 | 8.27 | f |
| 9.22 | 9.58 | f |
| 8.22 | 10.76 | ff |
| 7.91 | 11.17 | ff |
| 7.37 | 12.00 | ff |
| 7.19 | 12.29 | ff |
| 7.00 | 12.64 | ff |
| 6.30 | 14.05 | ff |
| 6.12 | 14.46 | ff |
| 5.98 | 14.80 | ff |
| 5.66 | 15.64 | ff |
| 5.32 | 16.65 | ff |
| 5.18 | 17.10 | ff |
| 5.07 | 17.48 | ff |
| 5.02 | 17.65 | ff |
| 4.60 | 19.28 | ff |
| 4.56 | 19.45 | ff |
| 4.36 | 20.35 | ff |
| 4.24 | 20.93 | ff |
| 4.19 | 21.19 | ff |
| 4.14 | 21.45 | ff |
| 4.06 | 21.87 | ff |
| 3.98 | 22.29 | ff |
| 3.95 | 22.47 | ff |
| 3.93 | 22.60 | ff |
| 3.91 | 22.68 | ff |
| 3.75 | 23.69 | ff |
| 3.72 | 23.88 | ff |
| 3.68 | 24.14 | ff |
| 3.62 | 24.56 | ff |
| 3.59 | 24.73 | ff |
| 3.53 | 25.16 | ff |
| 3.49 | 25.47 | ff |
| 3.39 | 26.20 | ff |
| 3.35 | 26.55 | ff |
| 3.28 | 27.11 | ff |
| 3.23 | 27.52 | ff | where FF=very high; m=mean; f=low; F=high; mf=medium low; ff=very low and that exhibits a chemical composition that is expressed on an anhydrous base, in terms of oxide moles, defined by the following general formula: $XO_2$:m $YO_2$:p $Z_2O_3$:q $R_{2/n}O$ in which R is the cation (6R,10S)-6,10-dimethyl-5-azoniaspiro[4,5]decane, X represents one or more tetravalent element(s) different from germanium, Y represents germanium, Z represents at least one trivalent element, whereby m, p and q respectively represent the mole number of $YO_2$, $Z_2O_3$ and $R_{2/n}O$, and m is between 0 and 1, p is between 0 and 0.5, and q is between 0 and 0.7, with the proviso that in the x-ray diffraction diagram of the calcined form, the line for which 2 theta=7.00°, corresponding to $d_{hkl}$=12.60 Å exhibits an I/Io relative intensity of between 60 and 85 compared to that of the line for which 2 theta=6.13° corresponding to $d_{hkl}$=14.40 Å which is the most intense line, said process comprising initiating mixing of (i) at least one source of at least one $XO_2$ oxide, (ii) organic cation R, at least one precursor of the organic cation or at least one decomposition product of the organic compound, (iii) optionally at least one source of the $YO_2$ oxide, and (iv) optionally at least one source of at least one $Z_2O_3$ oxide, and initiating hydrothermal treatment of said mixture until said im-12 crystallized solid is formed.

4. A process for the preparation of an IM-12 crystallized solid according to claim 3, wherein the molar composition of the reaction mixture is such that:

| | |
|---|---|
| $(XO_2 + YO_2)/Z_2O_3$ | at least 5, |
| $H_2O/(XO_2 + YO_2)$ | 1 to 50, |
| $R/(XO_2 + YO_2)$ | 0.1 to 3, |
| $YO_2/XO_2$ | 0 to 1. |

5. A process of preparation according to claim 3, such that seeds are added into the reaction mixture.

6. A process for the preparation of an IM-12 crystallized solid that exhibits an x-ray diffraction diagram that includes at least the lines that are inscribed in the table below:

| $d_{hkl}$ (Å) | 2 theta (°) | I/I$_O$ |
|---|---|---|
| 14.40 | 6.13 | FF |
| 12.60 | 7.00 | F |
| 11.98 | 7.37 | f |
| 10.69 | 8.27 | f |
| 9.22 | 9.58 | f |
| 8.22 | 10.76 | ff |
| 7.91 | 11.17 | ff |
| 7.37 | 12.00 | ff |
| 7.19 | 12.29 | ff |
| 7.00 | 12.64 | ff |
| 6.30 | 14.05 | ff |
| 6.12 | 14.46 | ff |
| 5.98 | 14.80 | ff |
| 5.66 | 15.64 | ff |
| 5.32 | 16.65 | ff |
| 5.18 | 17.10 | ff |
| 5.07 | 17.48 | ff |
| 5.02 | 17.65 | ff |
| 4.60 | 19.28 | ff |
| 4.56 | 19.45 | ff |
| 4.36 | 20.35 | ff |
| 4.24 | 20.93 | ff |
| 4.19 | 21.19 | ff |
| 4.14 | 21.45 | ff |
| 4.06 | 21.87 | ff |
| 3.98 | 22.29 | ff |
| 3.95 | 22.47 | ff |
| 3.93 | 22.60 | ff |
| 3.91 | 22.68 | ff |
| 3.75 | 23.69 | ff |
| 3.72 | 23.88 | ff |
| 3.68 | 24.14 | ff |
| 3.62 | 24.56 | ff |
| 3.59 | 24.73 | ff |
| 3.53 | 25.16 | ff |
| 3.49 | 25.47 | ff |
| 3.39 | 26.20 | ff |
| 3.35 | 26.55 | ff |
| 3.28 | 27.11 | ff |
| 3.23 | 27.52 | ff | where FF=very high; m=mean; f=low; F=high; mf=medium low; ff=very low and that exhibits a chemical composition that is expressed on an anhydrous base, in terms of oxide moles, defined by the following general formula: $XO_2$:m $YO_2$:p $Z_2O_3$:q $R_{2/n}O$ in which R is the cation (6R,10S)-6, 10-dimethyl-5-azoniaspiro[4,5]decane, X represents one or more tetravalent element(s) different from germanium, Y represents germanium, Z represents it least one trivalent element, whereby m, p and q respectively represent the mole number of $YO_2$, $Z_2O_3$ and $R_{2/n}O$, and m is between 0 and 1, p is between 0 and 0.5, and q is between 0 and 0.7, with the proviso that in the x-ray diffraction diagram of the calcined form, the line for which 2 theta=7.00°, corresponding to $d_{hkl}$=12.60 Å exhibits an I/Io relative intensity of between 62 and 68 compared to that of the line for which 2 theta=6.13° corresponding to $d_{hkl}$=14.40 Å which is the most intense line, said process comprising initiating mixing of (i) at least one source of at least one $XO_2$ oxide, (ii) organic cation R, at least one precursor of the organic cation or at least one decomposition product of the organic compound, (iii) optionally at least one source of the $YO_2$ oxide, and (iv) optionally at least one source of at least one $Z_2O_3$ oxide, and initiating hydrothermal treatment of said mixture until said im-12 crystallized solid is formed.

* * * * *

UNITED STATES PATENT AND TRADEMARK OFFICE
CERTIFICATE OF CORRECTION

PATENT NO. : 7,074,385 B2 Page 1 of 1
APPLICATION NO. : 10/871700
DATED : July 11, 2006
INVENTOR(S) : Harbuzaru et al.

It is certified that error appears in the above-identified patent and that said Letters Patent is hereby corrected as shown below:

Column 11, line 3 reads "it" should read -- at --

Signed and Sealed this

Second Day of January, 2007

JON W. DUDAS
*Director of the United States Patent and Trademark Office*